United States Patent [19]

Cunningham et al.

[11] Patent Number: 5,615,583
[45] Date of Patent: Apr. 1, 1997

[54] C-SHAPED PIN-CONNECTOR WITH FLEX HOLES

[75] Inventors: Jeffrey G. Cunningham, Dearborn; Allen G. Irish, Flint, both of Mich.

[73] Assignee: Teleflex Incorporated, Plymouth Meeting, Pa.

[21] Appl. No.: 573,445

[22] Filed: Dec. 15, 1995

[51] Int. Cl.$^6$ ..................................... F16C 1/14
[52] U.S. Cl. ...................... 74/502.4; 403/331; 24/669
[58] Field of Search ..................... 74/502.4, 502.6; 403/331; 24/669, 702

[56] References Cited

U.S. PATENT DOCUMENTS

| | | | |
|---|---|---|---|
| 882,483 | 3/1908 | Wilson | 24/669 |
| 3,626,429 | 12/1971 | Toder | 24/669 X |
| 4,331,041 | 5/1982 | Bennett | 74/502.4 X |
| 4,790,206 | 12/1988 | Thomas . | |
| 4,847,973 | 7/1989 | Lundeen . | |
| 5,106,223 | 4/1992 | Kraus | 24/669 X |
| 5,201,858 | 4/1993 | Otrusina | 24/702 X |
| 5,295,408 | 3/1994 | Nagle et al. . | |
| 5,447,745 | 12/1995 | Boike et al. | 74/502.6 |

Primary Examiner—Charles A. Marmor
Assistant Examiner—Mary Ann Battista
Attorney, Agent, or Firm—Howard & Howard

[57] ABSTRACT

A terminal (24) is attached to the end of a flexible core element (12) slidably supported in a conduit (14) and connects the core element (12) to a disc-shaped head (26) supported on a post (28). The terminal (24) includes a body (30) and a flange (32) spaced and parallel to the body (30) to define a pocket (34) between the flange (32) and the body (30) for receiving the disc-shaped head (26) with the flange (32) defining a circular opening (36) for surrounding the post (28) and an entrance (38) more narrow than the circular opening (36) for retaining the post (28) in the opening (36). The terminal (24) is characterized by the flange (32) including a pair of holes (44) adjacent the entrance (38) for rendering the flange (32) more flexible at the entrance (38) than the remainder of the flange (32) to facilitate the enlargement of the entrance (38) by the forced movement of the post (28) therethrough and to snap back as the post (28) seats in the circular opening (36).

1 Claim, 4 Drawing Sheets

C-SHAPED PIN-CONNECTOR WITH FLEX HOLES

TECHNICAL FIELD

The subject invention relates to a motion transmitting remote control assembly of the type transmitting motion in a curved path by a flexible core element and, more specifically, to the terminal for interconnecting the core element to a member to be controlled.

BACKGROUND OF THE INVENTION

Such remote control assemblies are used in automotive vehicles. For example, such a remote control assembly may interconnect the accelerator pedal and the fuel flow control system in an automobile. One well known terminal for interconnecting the core element and the throttle includes a plastic body defining a C-shaped pocket for receiving and retaining a disc-shaped head supported on a post, the terminal retaining the post and acting on the disc-shaped head to transmit motion. Examples of such terminal connections are disclosed in U.S. Pat. No. 4,790,206 to Thomas and U.S. Pat. No. 5,295,408 to Nagle et al.

A primary criteria for all such assemblies is the ease with which they can be installed into the automobile on the assembly line. More specifically, the forces required to install the assembly should be minimal yet it should remain difficult for the assembly to disengage itself.

SUMMARY OF THE INVENTION AND ADVANTAGES

A motion-transmitting remote-control assembly of the type for transmitting motion along a curved path by a flexible motion-transmitting core element which is slidably supported in a conduit with a terminal for connecting the core element to a disc-shaped head supported on a post. The terminal includes a body and a flange spaced and parallel to the body to define a pocket between the flange and the body for receiving the disc-shaped head. The flange defines a circular opening for surrounding the post and an entrance more narrow than the circular opening for retaining the post in the opening. The assembly is characterized by the flange including a characteristic adjacent the entrance for rendering the flange more flexible at the entrance than the remainder of the flange to facilitate the enlargement of the entrance by the forced movement of the post therethrough and to snap back as the post seats in said circular opening.

Accordingly, the terminal facilitates installation yet provides sufficient retention to prevent undesirable disconnection of the terminal from the post during normal operation.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals reference like or corresponding parts throughout the several views, a motion transmitting remote control assembly constructed in accordance with the instant invention is generally shown at 10. The motion-transmitting remote-control assembly 10 is of the type for transmitting motion along a curved path by a flexible motion-transmitting core element 12 slidably supported in a conduit 14. The core element comprises a wire or a plurality of filaments stranded together. The conduit typically comprises an inner tubular member made of plastic and surrounded by tension bearing long lay wires helically disposed on a long lead about the inner tubular member with a plastic casing extruded about the long lay wires. A fitting or ferrule 16 is made of plastic and bonded to the conduit for supporting the assembly 10 in a bulkhead 18, or the like. A swivel tube 20 is supported by and extends from the fitting 16. The swivel tube 20 can oscillate or swivel about its swivel connection to the fitting 16, as is well known in the art. A rod 22 is attached to the end of the core element 12 and is slidably disposed in the swivel tube 20.

A terminal, generally indicated at 24, is attached to the distal end of the rod 22 for connecting the core element 12 to a disc-shaped head 26 supported on a post 28, which, in turn, extends from a lever or like control member. The terminal 24 includes a body 30 and a flange 32 spaced and parallel to the body 30 to define a pocket 34 between the flange 32 and the body 30 for receiving the disc-shaped head 26. The flange 32 defines a circular opening 36 for surrounding the post 28 and an entrance 38 more narrow than, i.e., smaller than the diameter of, the circular opening 36 for retaining the circular post 28 within the opening 36.

The assembly 10 is characterized by the flange 32 including a characteristic adjacent the entrance or throat 38 for rendering the flange 32 more flexible at the entrance 38 than the remainder of the flange 32 to facilitate the enlargement of the entrance 38 by the forced movement of the post therethrough and to snap back as the post 28 seats in the circular opening 36. A wall 40 extends between the body 30 and the flange 32 to define the pocket 34. The wall 40 defines the pocket 34 as U-shaped and the flange 32 extends inwardly or radially a constant distance (x) from the wall 40 at the bottom or base of the U-shaped pocket 34. The flange 32 also extends inwardly a greater distance (y) from the wall 40 at the narrow entrance 38. The flange 32 defines a V-shaped guideway 42 to the narrow entrance 38. The body 30 presents a planar surface which is spaced from and parallel to an interior surface presented by the flange 32.

The characteristic is disposed in the flange 32 between the narrow entrance 38 and the wall 40 and comprises a hole 44 or void of material. More particularly, the void is defined by a pair of holes 44 extending completely through the flange 32, one of the holes 44 being on one side of the entrance 38 and the other hole 44 being on the other side of the entrance 38.

Figure 1:
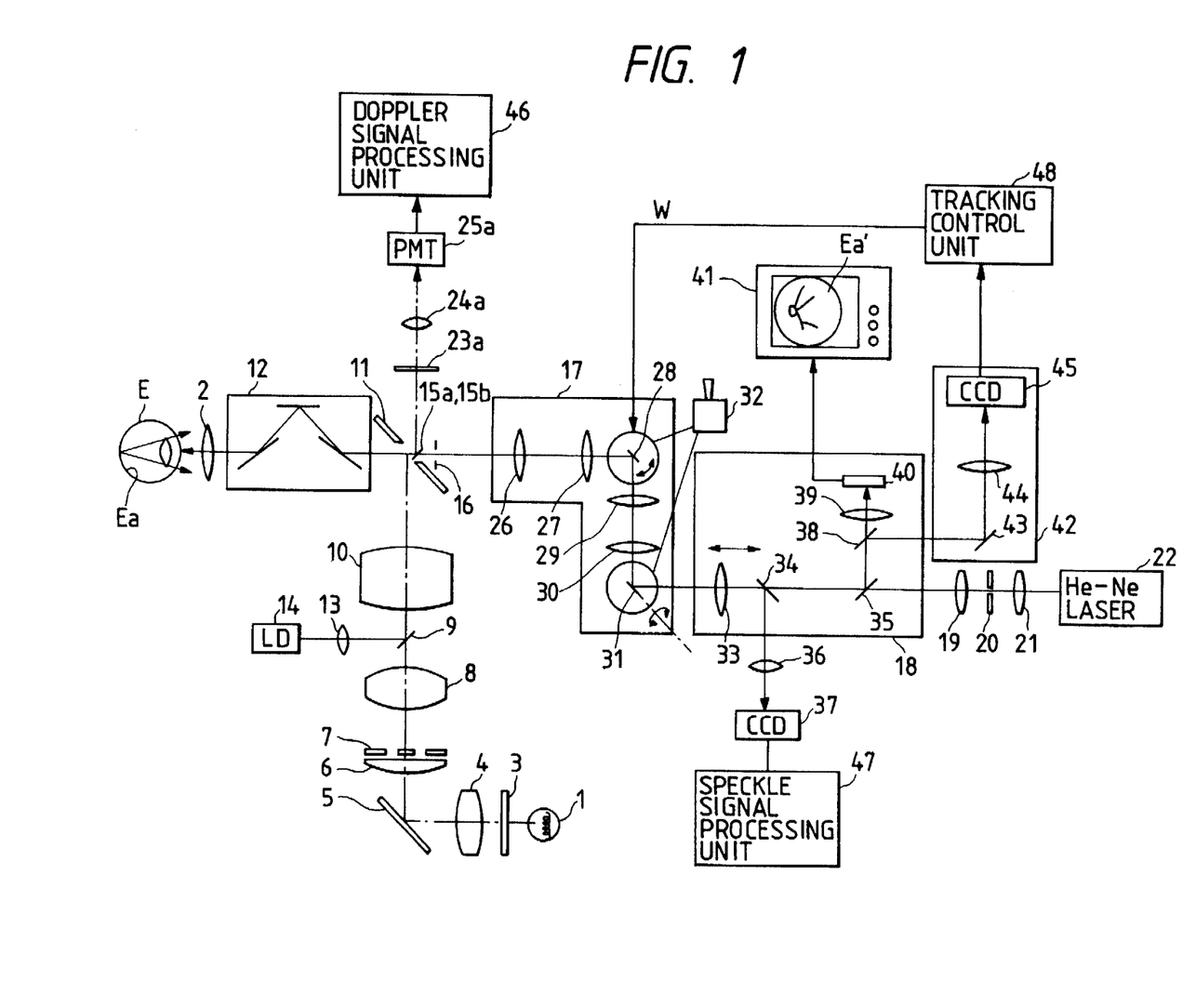
FIG. 1 is a side elevational view of a preferred embodiment of a motion transmitting remote control assembly of the subject invention.
Figures 1, 2, 3:
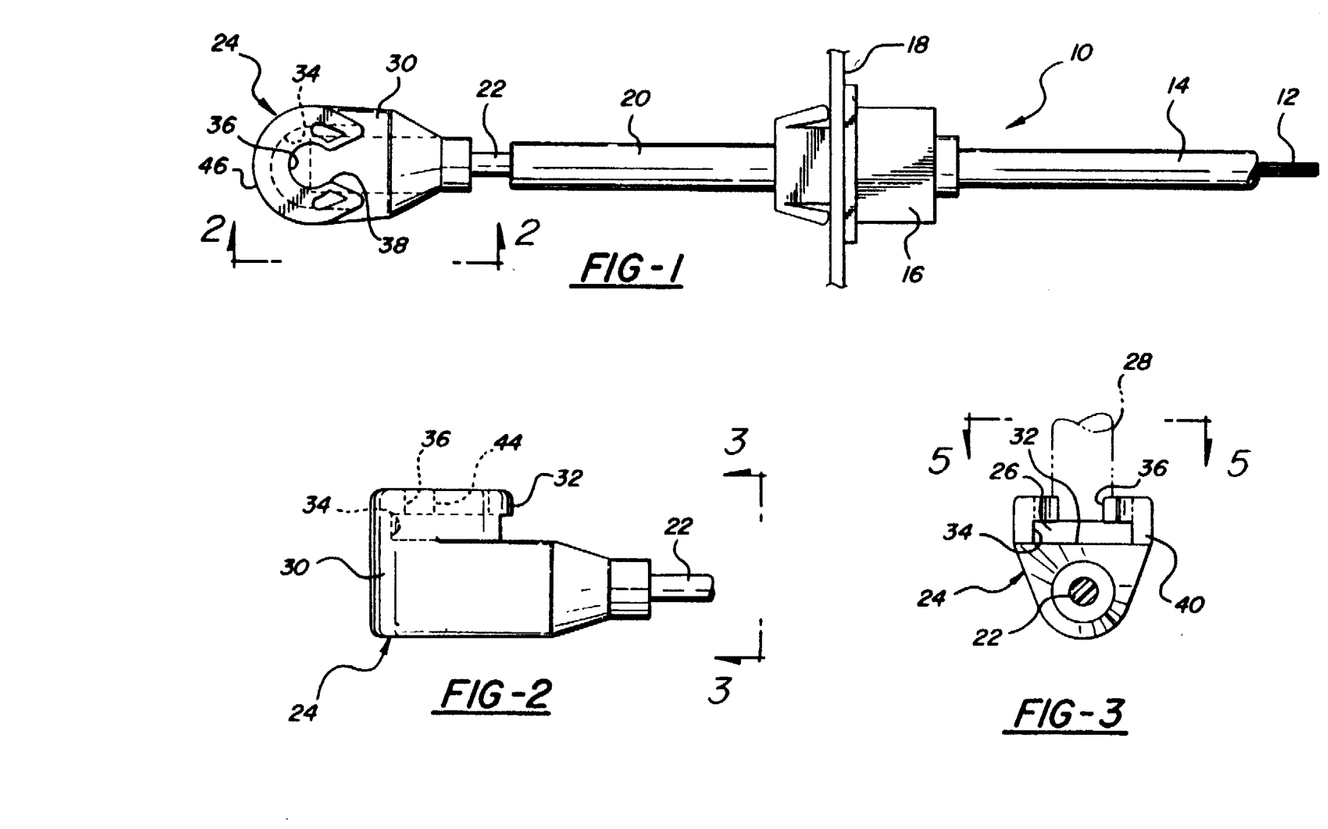
FIG. 2 a bottom view taken substantially along line 2—2 of FIG. 1.
FIG. 3 is a view taken substantially along line 3—3 of FIG. 2.
Figure 2:
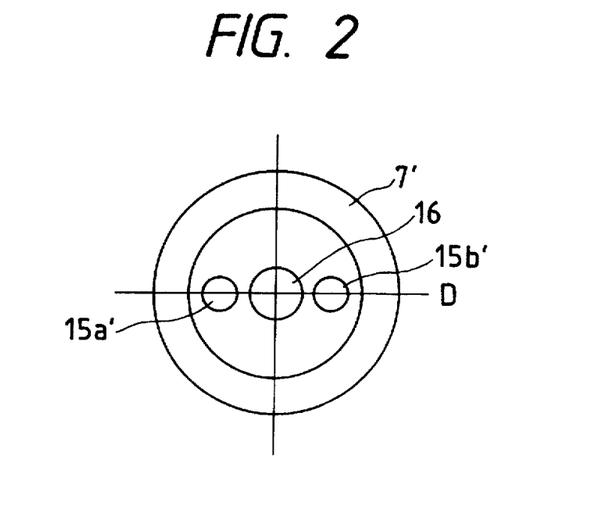
Figure 3:
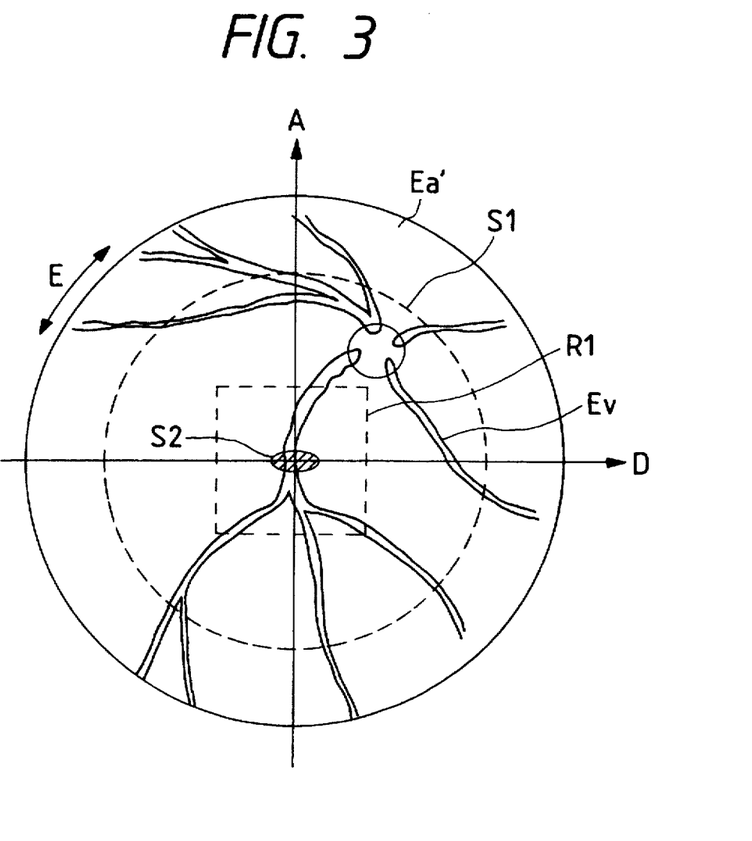
Figure 4:
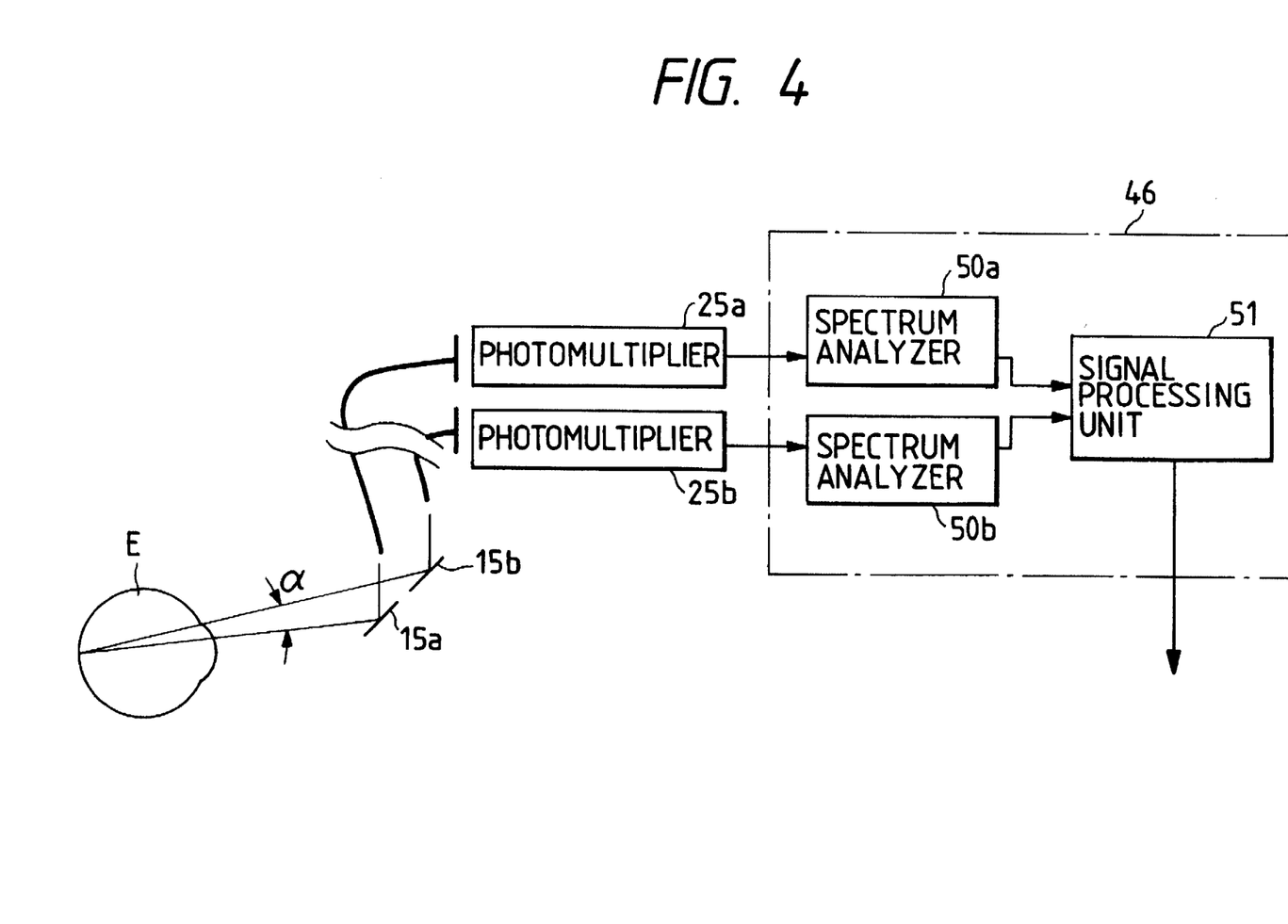
FIG. 4 is an exploded perspective view of the components of FIGS. 2 and 3.
Figure 5:
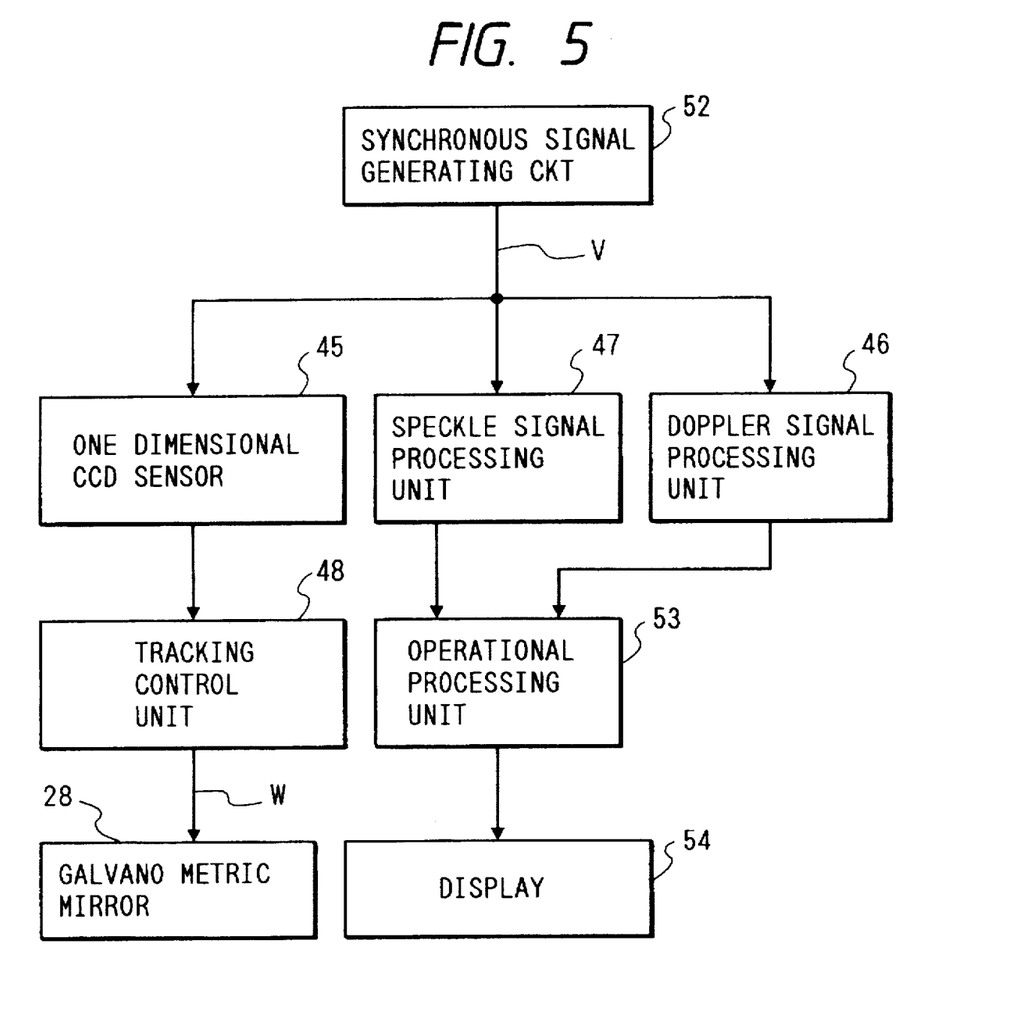
FIG. 5 is an enlarged elevational view taken substantially along line 5—5 of FIG. 3.

Each hole 44 has a first perimeter length 44a which is co-planar with the wall 34. Each hole 44 has a second perimeter length 44b extending parallel and spaced from the adjacent side of the V-shaped guideway 42. Each hole 44 has a third perimeter length 44c extending concentrically to and spaced inwardly from the circular opening 36. Each hole 44 has a fourth perimeter length 44d which is arcuate and interconnects the first 44a and third 44c perimeter lengths. Each hole 44 has a fifth perimeter length 44e interconnecting the first 44a and second 44b perimeter lengths. Each hole 44 has a sixth perimeter length 44f which is arcuate and interconnects the second 44b and fifth 44e perimeter lengths. The fourth perimeter length 44d is on a larger radius than the sixth perimeter length 44f. The fourth perimeter length 44d of each hole 44 is tangent to the diameter (D).

The body 30 and the wall 40 and the flange 32 are coextensive and circular to define a circular exterior 46 extending about the bottom of the U-shaped pocket 34. The circular exterior 46 extends 180° between a diameter (D) of the opening 36 which is perpendicular to the axis (A) the V-shaped guideway 42. The flange 32 has converging exterior surfaces 48 converging inwardly from the diameter (D) to define rounded points 50 with the V-shaped guideway 42. The fifth perimeter length 44e of each hole 44 is parallel to and spaced from the adjacent converging exterior surface 48 of the flange 32.

Accordingly, the terminal 24 facilitates installation of the post 28 through the narrow entrance 38 as the holes 44 allow the entrance 38 to flex yet provides sufficient retention to prevent undesirable disconnection of the terminal 24 from the post 28 during normal operation.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion-transmitting remote-control assembly (10) comprising:

a flexible motion-transmitting core element (12), a conduit (14) slidably supporting said core element (12), a terminal (24) for connecting said core element (12) to a disc-shaped head (26) supported on a post (28), said terminal (24) including a body (30) and a flange (32) spaced and parallel to said body (30) to define a pocket (34) between said flange (32) and said body (30) for receiving the disc-shaped head (26) with said flange (32) defining a circular opening (36) for surrounding the post (28) and an entrance (38) more narrow than said circular opening (36) for retaining the post (28) in said opening (36), said flange (32) including a pair of holes (44) extending therethrough adjacent said entrance (38) for rendering said flange (32) more flexible at said entrance (38) than the remainder of said flange (32) to facilitate the enlargement of said entrance (38) by the forced movement of the post (28) therethrough and to snap back as the post (28) seats in said circular opening (36);

a wall (40) extending between said body (30) and said flange (32) to define said pocket (34), said wall (40) defining said pocket (34) as U-shaped with a bottom, said flange (32) extending inwardly a constant distance (x) from said wall (40) at said bottom of said U-shaped pocket (34) and inwardly a greater distance (y) from said wall (40) at said entrance (38), said flange (32) defining a V-shaped guideway (42) with opposite sides extending to said entrance (38), said pair of holes (44) being disposed in said flange (32) between said entrance (38) and said wall (40), one of said holes (44) being on one side of said entrance (38) and the other hole (44) being on the other side of said entrance (38);

each hole (44) having a first perimeter length (44a) co-planar with said wall (40), a second perimeter length (44b) extending parallel and spaced from one of said opposite sides of said V-shaped guideway (42), a third perimeter length (44c) extending concentrically to and spaced inwardly from said opening (36), a fourth perimeter length (44d) which is arcuate and interconnects said first (44a) and third (44c) perimeter lengths, a fifth perimeter length (44e) interconnecting said first (44a) and second (44b) perimeter lengths, a sixth perimeter length (44f) which is arcuate and interconnects said second (44b) and fifth (44e) perimeter lengths, said fourth perimeter length (44d) being on a larger radius than said sixth perimeter length (44f);

said body (30) and said wall (40) and said flange (32) being coextensive and circular to define a circular (46) extending about said bottom of said U-shaped pocket (34), said V-shaped guideway (42) being disposed on an axis (A), said circular exterior (46) extending 180° between a diameter (D) of said opening (36) which is perpendicular to said axis (A) of said V-shaped guideway (42);

said flange (32) having converging exterior surfaces (48) converging inwardly from said diameter (D) to define points (50) with said V-shaped guideway (42);

said fifth perimeter length (44e) of each hole (44) being parallel to and spaced from the adjacent converging exterior surface (48) of said flange (32) and said fourth perimeter length (44d) of each hole (44) being tangent to said diameter (D); and including a fitting (16) for supporting said conduit (14) on support structure (18), a swivel tube (20) extending from said fitting (16), a rod (22) slidably supported in said swivel tube (20), said terminal body (30) being attached to a distal end of said rod (22).

\* \* \* \* \*

UNITED STATES PATENT AND TRADEMARK OFFICE
CERTIFICATE OF CORRECTION

PATENT NO. : 5,615,583
DATED : April 1, 1997
INVENTOR(S) : Jeffrey G. Cunningham, et. al.

It is certified that error appears in the above-identified patent and that said Letters Patent is hereby corrected as shown below:

The Title page should be deleted and substitute therefor the attached Title page.

Drawing:

Delete Figures 1-5 and insert Figures 1-5 as shown on the attached page.

Signed and Sealed this

Second Day of September, 1997

*Attest:*

BRUCE LEHMAN

*Attesting Officer*   *Commissioner of Patents and Trademarks*

United States Patent

Cunningham et al.

[11] Patent Number: 5,615,583
[45] Date of Patent: Apr. 1, 1997

[54] C-SHAPED PIN-CONNECTOR WITH FLEX HOLES

[75] Inventors: Jeffrey G. Cunningham, Dearborn; Allen G. Irish, Flint, both of Mich.

[73] Assignee: Teleflex Incorporated, Plymouth Meeting, Pa.

[21] Appl. No.: 573,445

[22] Filed: Dec. 15, 1995

[51] Int. Cl.⁶ .................................................. F16C 1/14
[52] U.S. Cl. ............................... 74/502.4; 403/331; 24/669
[58] Field of Search ............................ 74/502.4, 502.6; 403/331; 24/669, 702

[56] References Cited

U.S. PATENT DOCUMENTS

| | | | |
|---|---|---|---|
| 882,483 | 3/1908 | Wilson | 24/669 |
| 3,626,429 | 12/1971 | Toder | 24/669 X |
| 4,331,041 | 5/1982 | Bennett | 74/502.4 X |
| 4,790,206 | 12/1988 | Thomas | |
| 4,847,973 | 7/1989 | Lundeen | |
| 5,106,223 | 4/1992 | Kraus | 24/669 X |
| 5,201,858 | 4/1993 | Otrusina | 24/702 X |
| 5,295,408 | 3/1994 | Nagle et al. | |
| 5,447,745 | 12/1995 | Boike et al. | 74/502.6 |

*Primary Examiner*—Charles A. Marmor
*Assistant Examiner*—Mary Ann Battista
*Attorney, Agent, or Firm*—Howard & Howard

[57] ABSTRACT

A terminal (24) is attached to the end of a flexible core element (12) slidably supported in a conduit (14) and connects the core element (12) to a disc-shaped head (26) supported on a post (28). The terminal (24) includes a body (30) and a flange (32) spaced and parallel to the body (30) to define a pocket (34) between the flange (32) and the body (30) for receiving the disc-shaped head (26) with the flange (32) defining a circular opening (36) for surrounding the post (28) and an entrance (38) more narrow than the circular opening (36) for retaining the post (28) in the opening (36). The terminal (24) is characterized by the flange (32) including a pair of holes (44) adjacent the entrance (38) for rendering the flange (32) more flexible at the entrance (38) than the remainder of the flange (32) to facilitate the enlargement of the entrance (38) by the forced movement of the post (28) therethrough and to snap back as the post (28) seats in the circular opening (36).

1 Claims, 2 Drawing Sheets

FIG-4

FIG-5